United States Patent [19]

Hughes

[11] Patent Number: 4,682,335
[45] Date of Patent: Jul. 21, 1987

[54] COMPOSITE LASER OSCILLATOR

[75] Inventor: John L. Hughes, Canberra, Australia

[73] Assignee: Hughes Technology PTY LTD, Canberry, Australia

[21] Appl. No.: 701,496

[22] Filed: Feb. 14, 1985

[30] Foreign Application Priority Data

Feb. 15, 1984 [AU] Australia ............................. PG3626

[51] Int. Cl.⁴ ................................................ H01S 3/30
[52] U.S. Cl. .......................................... 372/6; 372/92; 372/66; 350/96.29; 350/96.15
[58] Field of Search .................. 372/6, 66, 62, 92, 99; 350/96.15, 96.29

[56] References Cited

U.S. PATENT DOCUMENTS 4,181,901  1/1980  Heyke ............................. 331/94.5 S
4,479,224  10/1984  Rediker ............................... 372/92
4,553,238  11/1985  Shaw et al. ............................... 372/6

*Primary Examiner*—Leon Scott, Jr.
*Attorney, Agent, or Firm*—Cushman, Darby & Cushman

[57] ABSTRACT

This invention relates to a scalable, composite laser oscillator for generating a single laser output beam by phase locking and adding together a number of outputs from smaller laser fibre oscillators the ends of which are coherently packed into an optically polished face on to which a dielectric laser mirror is deposited, one of said faces acting as an output aperture for the scalable beam. The invention uses a computer to switch the laser gain medium of the sub-oscillators on and off and this switching process can be used to generate patterns on the output aperture of the system.

The invention is useful as a compact source of laser beam energy for use in industry, medicine, commerce and defence.

11 Claims, 7 Drawing Figures

COMPOSITE LASER OSCILLATOR

FIELD OF THE INVENTION

This invention relates to a scalable laser oscillator system for generating a single laser output beam by adding together the phased-locked output beams of a large number of smaller laser oscillators, said system consisting of two mirrors defining the resonator cavity, arrays of lasers located between said mirrors, each one of said lasers being electrically connected to a power supply and optically coupled via precision optical components to the whole or part of a layer of coherently packed, single mode, single polarisation, optical fibres whose other ends are compacted into optically polished ends of the fibre bundles facing their respective mirrors. The invention combines the output of a plurality of smaller laser oscillators, each one of which is composed of two mirrors, two lengths of single mode, single polarisation, optical fibres and a laser gain medium all coupled together via precision optical components, into a single laser oscillator of much larger dimensions, which is scalable depending on the number of the smaller individual oscillators used. In this way a very powerful laser oscillator output beam can be generated from a composite oscillator which has applications in industry, defence, medicine, commerce and entertainment fields.

PRIOR ART

Prior art laser oscillators produce a single output beam from a single active medium and were not scalable to high power levels.

BACKGROUND OF THE INVENTION

Since the advent of the laser in 1960, efforts to scale particular laser oscillators have failed to realise high power outputs over apertures in excess of about 50 cms in diameter. The reasons for this limitation are complex but can be summarised as being either due to the inability to excite increasingly large laser gain medium volumes or due to the onset of parasitic oscillations within the expanded laser oscillator cavity which depletes the stored energy that would otherwise be used to generate the laser beam. Adding the output of individual laser oscillators to produce scalable laser output beams does not improve matters unless the scaled output laser output beams does not improve matters unless the scaled output laser beam is actually a single laser beam in its own right. The present invention achieves this requirement by locking together the laser beam generating properties of a large number of laser oscillators so that their combined outputs behave like a single beam output. Two major problems have to be overcome, namely, that the polarisation of the sub-oscillators have to be aligned with respect to each other and each of the said sub-oscillators is sufficiently close to its neighbour to ensure that phase-locking occurs.

In the present invention the alignment of the polarisation of the output of the various sub-oscillators is achieved via the use of appropriately stacked, single mode, single polarisation optical fibres whilst the necessary close packing of the oscillator output apertures is achieved via the packing together, coherently, of the optically polished ends of each of the fibres, into a composite aperture which behaves as a single beam laser oscillator aperture. The lasing medium used to generate the laser radiation within the laser sub-oscillators can either be electrically or optically excited and are inserted into the individual single mode, single polarisation optical fibres and connected to them via appropriate optical components for example, lenses, and single mode optical fibre connectors. If the lasing medium is in the form of a semiconductor, then the excitation of said medium is via direct electrical current. On the other hand, if the lasing medium is in the form of doped optical fibre or doped crystalline segment, then the said laser medium can be optically excited via arrays of photo emitting diodes or miniature flashtubes. If the lasing medium is in the form of a gaseous medium within an appropriate container, then the excitation means can also be in the form of direct current.

For a laser oscillator to be scalable, it is necessary for the same operating conditions to apply for a given small cross-sectional area of the laser structure as applies for cross-sectional area many orders of magnitude larger. For example, the operating properties of a one millimeter square area of the output aperture must behave in the same manner as an area of many tens of square meters if required. In the present invention, scalability depends only on the number of individual sub-oscillators that can be added together.

This can be achieved in two ways, firstly, by building tapes of optical fibres and stacking them together to form a coherently packed array or by winding the optical fibre onto a reel and cutting the wound fibre, again achieving a coherently packed fibre array. By grouping the fibres together so that each group can be excited from a single laser amplifying medium the output for said group can be phased locked. By grouping the sub-groups together to form a super group of fibres, the invention can be scaled indefinitely whilst maintaining a phased locked output. In other words individual fibre laser oscillators can be grouped together to form a phased-locked single beam output from a composite laser oscillator whilst such oscillators can also be grouped together to form a super group of composite oscillators. Alternatively, the grouping can be dispensed with entirely and the fully scaled composite oscillator be formed entirely from the ungrouped fibre oscillators. However, the grouping of the individual fibre oscillators during the scaling process allows for simpler addition since each group can be fully tested before inclusion into a super group as the aperture is scaled up.

In general, the closer together the individual fibre oscillators are in the final optically polished apertures, the more effective will be the phase locking process. This means that the cladding of the optical fibres used need not be of such large dimensions as in the case for the optical fibres used for optical communications. In general, the thinner the cladding thickness the more the loss in the fibre—which in the case of the present invention can contribute to interaction between the laser light transmitted within the fibres necessary to ensure excellent phase-locking.

The optically polished end faces of the individual fibres can either be achieved by separately polishing each fibre or by polishing the coherently packed end faces as a whole. If the fibres are polished individually, then their ends have to be positioned so as to achieve a final output aperture which is optically polished.

In order to operate the composite laser oscillator it is necessary to set up two mirrors, one each end of the oscillator cavity. The simplest way of doing this is to deposit a mirror onto the optically polished end faces of the coherently packed fibres. Another way of utilising the required mirrors is to deposit the reflecting surface onto a separate substrate which is also optically polished and then press it against the end surfaces of the fibre faces.

When all of the laser media are excited together, all of the fibres constituting the end faces of the composite oscillator emit in a phase-locked manner. However, this mode of operation, particularly when the number of fibres used are not large, leads to high non-uniformity of the laser output beam. To cure this defect it is necessary to modify the spacing between the various rows of fibres forming the output aperture. This can be achieved in the present invention by simply not activating various rows in fibres.

The ability to selectively switch individual fibres or groups of fibres allows the invention not only to have an optimised output beam but also provides the means for generating high definition images on the output apertures. For example, if the letter "O" were to be formed, then either all of the fibres in the output aperture corresponding to the letter "O" would not be activated whilst all other fibres would be activated then a high definition "O" is generated. Alternatively, all of the optical fibres corresponding to the letter "O" could be activated and all the others left unexcited. To generate a high definition image on the output aperture of the composite oscillator, a computer control of the excitation of the laser medium arrays is necessary. If a full colour presentation is required then each of the basic transmitter sites must include three fibre transmitters of blue, green and red respectively. In this way the invention converts into a high definition picture transmitter, capable of projecting a high intensity laser beam image. Alternatively, the invention can be used as a laser marker either in a divergent or convergent beam mode.

The high definition image generation on the output aperture of the composite laser oscillator results from the high packing densities achieved, for example a ten micron diameter fibre would provide an array of $1,000 \times 1,000$ per $cm^{-2}$ of the output aperture. The input signal to the control computer could be from a TV station so that the output of the laser oscillator would be in the form of TV images. Since the output beam intensity would be relatively high, up to several kilojoules, the composite oscillator with computer control of the firing sequences of the laser medium arrays, would allow for the laser making of any material surface via the burning of said TV or other images directly onto said surfaces. The invention can be operated either in the continuous or pulsed mode since all of the heatable regions of the device, in particular the excited laser media, are well spread out and could be cooled if it was necessary to do so.

SUMMARY OF THE INVENTION

It is an object of the present invention to achieve a single, scalable laser beam by adding together a large number of laser beams emitted by a coherently packed array of optically polished single mode, single polarization optical fibres, each of said optical fibres forming part of a laser oscillator in their own right. Another object of the invention is to excite a fraction of the total number of the single fibre laser oscillators, the output ends of which are compacted into the coherently packed array which forms the output face of the invention, such that the distribution of excited and non excited fibres forming said output face form images on said face, whose definition are proportional to the optical fibre densities within said array.

A further object of the invention is to transmit a single laser beam from its output aperture such that images formed on said aperture are projected onto viewing screens.

A still further object of the invention is to switch the individual fibre laser oscillators such that the images formed on the composite laser output aperture are those transmitted from a television transmitting station.

Another object of the invention is to spread out the heat loadings in a laser oscillator in those portions where the laser excitation takes place but to compact those parts with minimum heat loadings.

Another object of the invention is to extend the length of the individual fibre laser oscillators so that the coherently packed array bundle can be passed near a remote object whose properties have to be sensed via their effect on the lasing properties of the composite oscillator or on the properties of individual fibre oscillators forming said array.

Yet another object of the invention is to maximise the laser beam output of the composite laser oscillator for a given oscillator volume.

The invention allows for the generation of a powerful, scalable laser beam from a single laser oscillator without the onset of parasitic oscillations within the laser oscillator cavity in a direction other than that along the axis of the individual fibres forming the sub-oscillators.

The invention is a composite structure made up of coherently packed arrays of laser sub-oscillators, each sub-oscillator being composed of a length of single mode, single polarisation optical fibre, whose two ends are optically polished and having either a dielectric mirror deposited directly onto them or pressed up against them, said laser oscillations occurring between said mirrors when the laser gain medium inserted into said optical fibre is excited above lasing threshold, by direct electrical or optical means.

By adjusting the excitation of the sub-laser oscillators it is possible to adjust the lobe structure of the output of the composite aperture such that a single lobe is achieved.

The invention allows for the production of laser beams from a diameter of a laser wavelength to many meters in diameter with a corresponding power output from a few nanowatts ($10^{-9}$ watts) to several megawatts ($10^6$ watts) in continuous or pulsed modes.

An advantage of the composite aperture of this invention is that the output surface of the composite aperture can be formed into a range of configurations by adjusting the position of each of the coherently packed, optically polished fibre ends forming said array relative to each other by a precisely known amount. For example, to form a flat output aperture, the fibre ends are pulled together so that their polished ends are all parallel. On the other hand, a concave surface can be formed by adjusting the said fibre ends appropriately. In this way, output beam profiles of different configurations can be achieved.

The scalable laser output beam of the invention is generated by phase-locking the output of the arrays of laser sub-oscillators forming the composite output aperture. The best phase locking is achieved when the packing density of the optical fibres of the laser sub-oscillators are greatest. Ideally one should aim for a sub-oscillator packing density of 1,000×1,000 per cm² of the output aperture. Furthermore, to achieve such packing densities in the optical region it is necessary to minimise the thickness of the optical fibre cladding. This in turn increases the loss of the fibres but this does not matter significantly over the short lengths of fibres used in a typical form of the invention and increases the interaction between fibres needed for phase locking of the outputs.

BRIEF DESCRIPTION OF THE SEVERAL VIEWS OF THE DRAWINGS

A better understanding of the invention will be gained from the following description taken in conjunction with the accompanying drawings. It is emphasised that the ensuing teachings are exemplary and not limitative of the scope of the invention. In the drawings.

DETAILED DESCRIPTION

Figure 1:
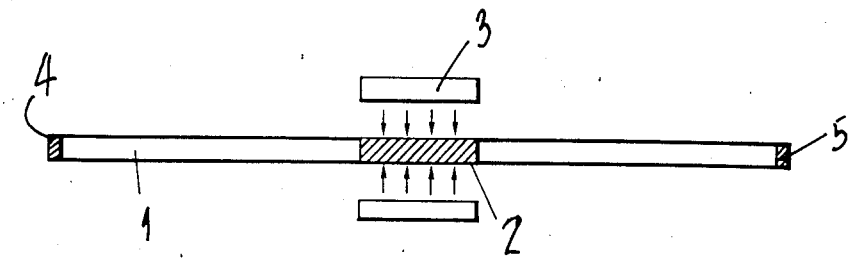
FIG. 1 is a schematic layout of a preferred system for the generation of a laser beam in a fibre laser sub-oscillator, consisting of a length of single mode, single polarisation optical fibre into which has been inserted an optically excited laser gain medium, the optically polished ends of said fibre having a fully reflecting and partially reflecting dielectric mirror deposited on them respectively.

In the sub-laser oscillator shown in FIG. 1, numeral 1 indicates a single, single mode, single polarisation optical fibre into which a laser gain medium indicated by numeral 2 is inserted, which in turn is optically excited via photo-emitting diodes indicated by numeral 3. Dielectric mirrors are deposited directly onto the optically polished ends of fibre 1, the 100 percent reflecting mirror being indicated by numeral 4, whilst the partially transmitting mirror deposited on the other end of the oscillator is indicated by numeral 5.

Figure 2:
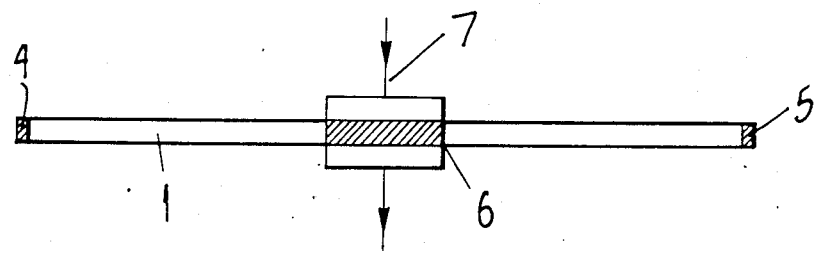
FIG. 2 is a schematic layout of a preferred system for the generation of a laser beam in a fibre laser sub-oscillator, which is electrically excited, consisting of a length of single mode, single polarisation optical fibre with a laser gain medium inserted which is electrically excited, the ends of said fibres being treated as in FIG. 1.

FIG. 2 shows the sub-laser oscillator with a direct current excited laser gain medium indicated by numeral 6 inserted into fibre 1 and excited via current lead indicated by numeral 7 which in urn is connected to a power supply not shown.

Figure 3:
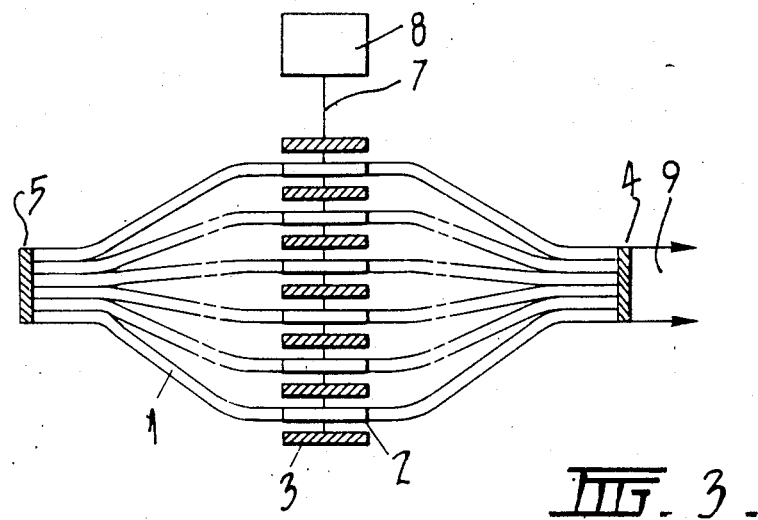
FIG. 3 is a schematic layout of a preferred system which generates a scalable, single laser oscillator output beam by adding together all the phased locked outputs of the individual laser sub-oscillators outlined in FIG. 1 or FIG. 2. Here, the laser oscillator mirrors may either be deposited directly onto the composite fibre surfaces or take the form of separate mirrors positioned near to the said fibre end faces.

FIG. 3 shows a composite laser oscillator made up of sub-laser oscillators of the type shown in FIGS. 1 and 2 some of the fibres 1 being shown dotted due to the fact that they are all of equal lengths. The output beam of the composite oscillator indicated by numeral 9. Numeral 8 indicates the power supply used to excite photo-emitting diode array 3 via lead 7.

Figure 4:
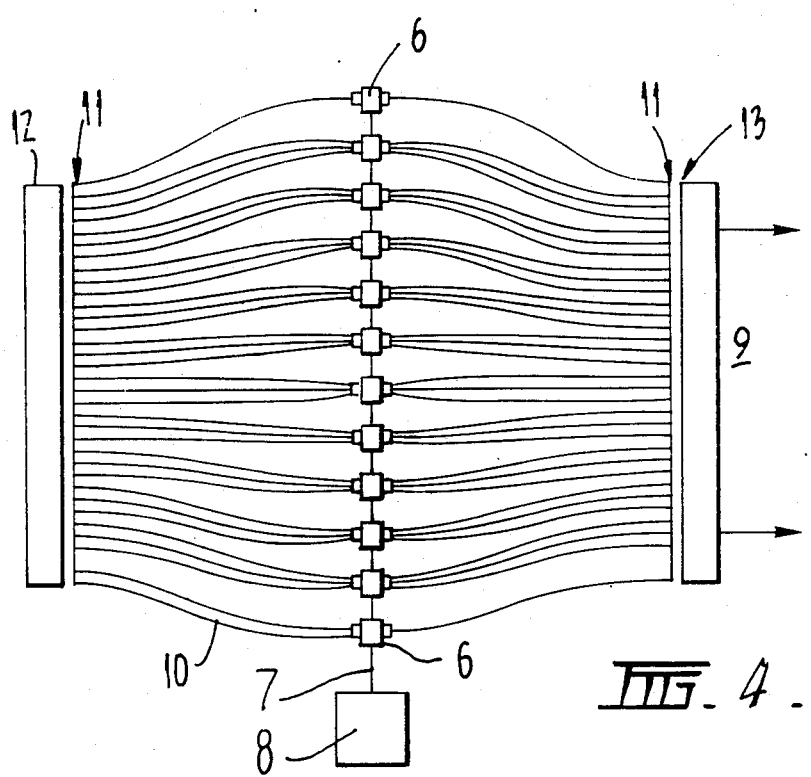
FIG. 4 is a schematic layout showing a row of fibres connected to a single laser gain medium.

FIG. 4 shows a configuration of the invention with several optical fibres, indicated by numeral 10, connected to a single laser gain medium 6, said laser gain media 6 then being stacked upon each other to produce the coherently packed, optically polished end faces indicated by numeral 11. Both the laser oscillator mirrors are now separated from surface 11, the 100 percent reflecting mirror indicated by numeral 12 whilst the partially reflecting mirror, indicated by numeral 13, transmits output beam 9.

Figure 5:
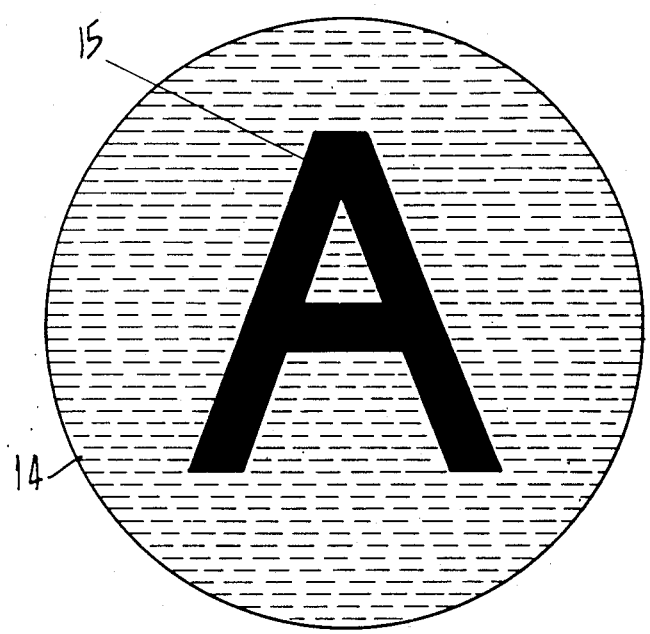
FIG. 5 is a schematic layout showing the effect of only activating part of the sub-oscillator arrays.

FIG. 5 shows the operation of the composite laser oscillator of this invention with only some of the sub-laser oscillators activated.

Figure 6:
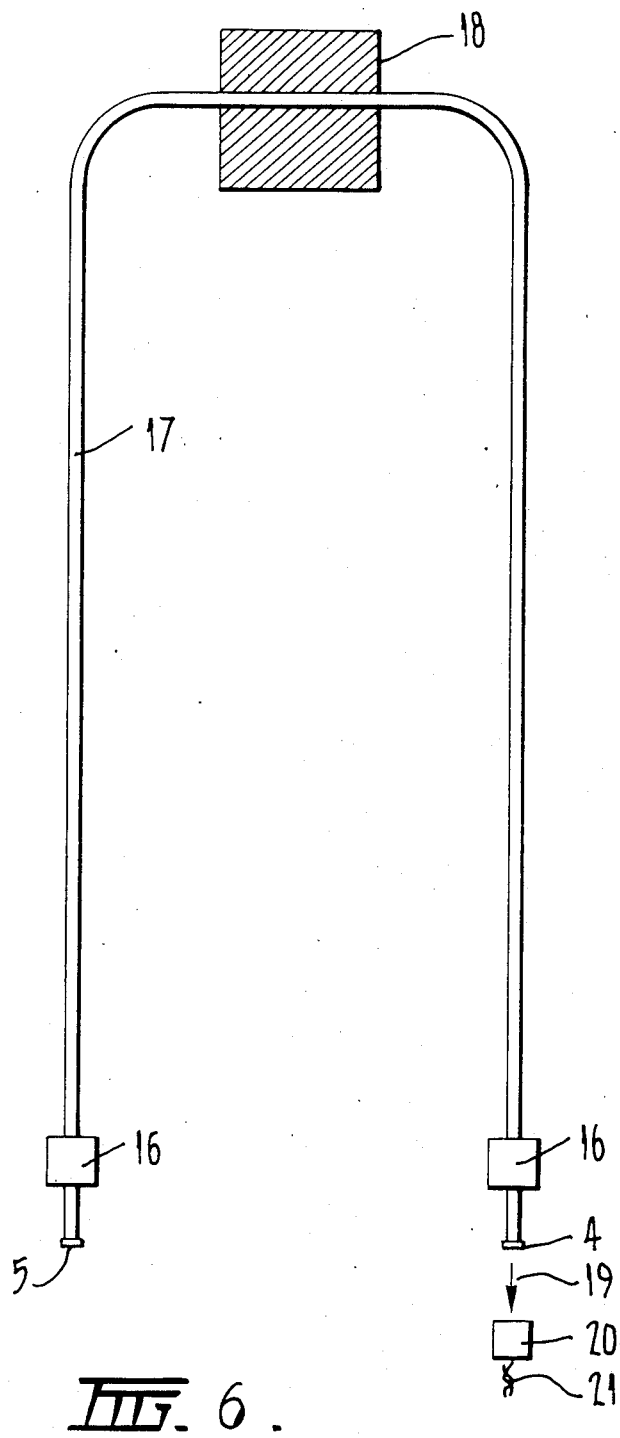
FIG. 6 shows a schematic layout of the invention used as a laser sensor with the properties of the object to be sensed affecting the lasing qualities of the sub-oscillators.

The output face of the composite oscillator indicated by numeral 14 has an unactivated region indicated by numeral 15, in the form of a letter "A" which is then transposed to the transmitted laser beam. FIG. 6 shows the invention used as a remote sensor with the laser gain media indicated by numeral 16 connected by the optical fibre bundle indicated by numeral 17 which passes through the remote site indicated by numeral 18. The output of the composite laser oscillator, indicated by numeral 19 is monitored by optical detector indicated by numeral 20 whose output is analysed via leads indicated by numeral 21 to equipment not shown. The properties of remote site 18 modify the lasing properties of the composite oscillator, even if it contains only one fibre indicated by numeral 1. This modification in the lasing properties of the invention by the environment provided at 18, be it electrical, magnetic, heat, sound or vibrations, is reflected in the output laser parameters. By checking these modified parameters against known distortions the properties of the remote site 18 can be assessed.

Figure 7:
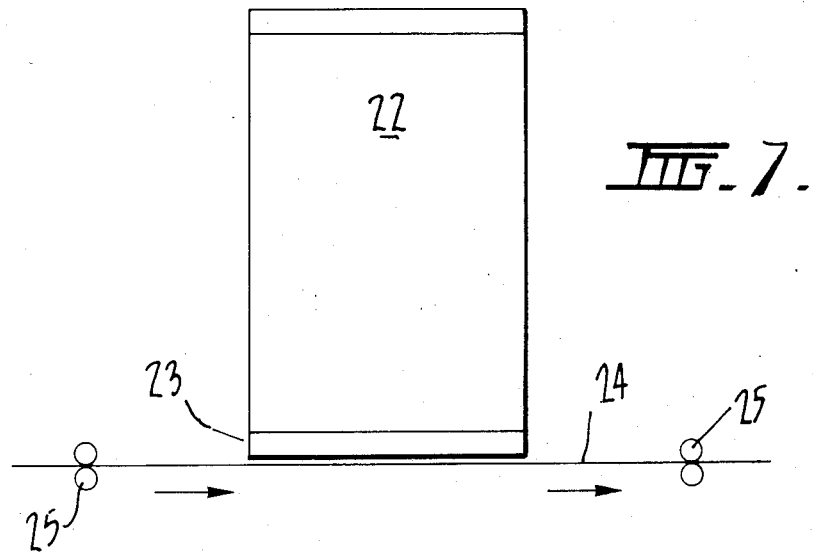
FIG. 7 shows a schematic layout of the invention used as a flat plate photocopier.

FIG.7 shows the invention used indicated by numeral 22, being used via the output aperture indicated by numeral 23, the selectively neutralised charged paper indicated by numeral 24 being passed under face 23 via rollers indicated by numeral 25. This process can be used to record the images displayed on face 23 on paper 24 via the well known photocopying technique. Photosensitive materials can also be used with this configuration of the invention for the recording of TV images, computer print-outs and photographic slides. A particular use of this invention is to provide a compact laser source in industrial work-stations for laser welding, laser cutting, laser drilling and laser annealing of metals.

The invention has uses in therapy lasers, high intensity TV projector, laser photocopier, laser surgical systems and any laser based application requiring high intensity laser light from a compact source. The invention has uses such as laser ranging, laser radar, target designators and laser terrain profilers.

It should be noted that the laser gain media are switched on and off with a computer to match the rate of change and complexity of the images.

Modifications may be made within the above described subject matter without departing from the spirit and scope of the invention.

I claim:

1. A scalable laser oscillator system comprising: a bundle of single mode, single polarization, thinly clad optical fibre laser oscillators, each optical fiber laser oscillator having two ends and a laser gain medium disposed between said ends, said bundle being coherently packed with the two ends of each of said fibre oscillators being optically polished and coated with layers of dielectric material such that said ends act as laser mirrors, one mirror being substantially 100% reflective at a lasing, which may be different for each oscillator and the other mirror being partially reflective at said lasing wavelength to allow for the transmission and emission of laser light generated within said oscillator, said bundle ends being compressed into two solid optically polished faces such that said 100% reflecting mirrors together form a reflecting face and said partially reflecting mirrors together form an output face, the remainder of said fibre bundle being loosely bound to allow for excitation of the laser gain medium;

said fibre oscillators which operate in response to control signals from a computer, reflect onto said end mirrors phases of outputs of each fiber oscillator are locked together and combine to form a single lobe output beam as a result of laser light leaking from individual fiber oscillators to neighboring fiber oscillators through said thin cladding.

2. A system as claimed in claim 1 further comprising an electrically excitable photo-emitting diode array surrounding each of said fibres in the loosely bound region of said fibre bundle, wherein the laser gain medium is incorporated into the core of the fibre of the oscillators and wherein said laser gain medium includes neodymium ions which are excited by the narrow bandwidth optical emissions of said electrically excited photo-emitting diode array.

3. A system as claimed in claim 1 wherein the laser gain medium is a gallium arsenide semiconductor which is incorporated into the core of the fibres and which generates laser radiation within said fibre laser oscillator when an electric current traverses a junction of said semiconductor laser.

4. A system as claimed in claim 1 wherein said bundle has an output face which has up to one million fibre laser output ends per square centimeter which can be switched on to emit laser radiation by selectivity exiciting said laser fibre oscillators above their lasing thresholds in response to the control signals and corresponding to a particular pattern of numbers, words or high definition pictures which are generated on said output face, such that projected laser beam image decreases in intensity with propagation distance for a divergent beam and increases in intensity with propagation distance for a convergent beam.

5. A system as claimed in claim 4 wherein the individual oscillators may be selectively switched in response to the control signals and according to a scanning sequence generated by a television camera so that real time television images are generated on the output face of said bundle, such that the emitted laser beam is emitted at high beam intensities for large screen displays in the divergent beam propagation mode and for laser beam image marking of an array object in the convergent beam propagation mode.

6. A system as claimed in claim 4 wherein the oscillator ends are in groups of three, respectively emitting blue, green and red laser light to produce a full color television image on said output face.

7. A system as claimed in claim 1 wherein the oscillator ends are in groups of three, respectively emitting blue, green and red laser light to produce a full color television image on said output face.

8. A system as claimed in claim 1 wherein the coherent packing of said fibre oscillators is achieved firstly by forming single 10,000 fibre tapes of single fibre thickness bonded at both ends, then stacking 10,000 such fibre tapes on top of each other to form a 100,000,000 fibre stack bonded at both ends to form said two optically polished faces, the scaling of said system being achieved by stacking said fibre oscillator stacks together to form the optically polished output face of required dimensions.

9. A system as claimed in claim 1 wherein the area of the output face is one square millimeter and the two faces are two centimeters apart.

10. A system as claimed in claim 1 wherein the area of the output face is one square meter and the two faces are fifty meters apart.

11. A system as claimed in claim 1 wherein the packing density of the laser fibre oscillator ends forming the two faces are one million per square centimeter.

* * * * *